United States Patent
Andrade Costa et al.

(10) Patent No.: US 10,545,839 B2
(45) Date of Patent: Jan. 28, 2020

(54) CHECKPOINTING USING COMPUTE NODE HEALTH INFORMATION

(71) Applicant: International Business Machines Corporation, Armonk, NY (US)

(72) Inventors: Carlos Henrique Andrade Costa, White Plains, NY (US); Yoonho Park, Chappaqua, NY (US); Chen-Yong Cher, Port Chester, NY (US); Bryan Rosenburg, Cortlandt Manor, NY (US); Kyung Ryu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 15/853,343

(22) Filed: Dec. 22, 2017

(65) Prior Publication Data
US 2019/0196920 A1      Jun. 27, 2019

(51) Int. Cl.
*G06F 11/00*    (2006.01)
*G06F 11/14*    (2006.01)

(52) U.S. Cl.
CPC .... *G06F 11/1471* (2013.01); *G06F 2201/805* (2013.01); *G06F 2201/82* (2013.01)

(58) Field of Classification Search
CPC ............. G06F 11/1446; G06F 11/1451; G06F 11/1464; G06F 11/1469; G06F 11/1471
See application file for complete search history.

(56) References Cited

U.S. PATENT DOCUMENTS

| | | | | |
|---|---|---|---|---|
| 6,535,923 B1* | 3/2003 | Giroir | ...................... | H04L 67/14 370/235 |
| 8,122,281 B2* | 2/2012 | Bansal | .................. | G06F 9/5044 714/2 |

(Continued)

FOREIGN PATENT DOCUMENTS

| | | |
|---|---|---|
| EP | 1069487 A1 | 1/2001 |
| EP | 2703991 A2 | 3/2014 |
| WO | 2013055760 A1 | 4/2013 |

OTHER PUBLICATIONS

M. Snir, R. W. Wisniewski, J. A. Abraham, S. V. Adve, S. Bagchi, P. Balaji, J. Belak, P. Bose, F. Cappello, B. Carlson, A. A. Chien, P. Coteus, N. A. Debardeleben, P. Diniz, C. Engelmann, M. Erez, S. Fazzari, A. Geist, R. Gupta, F. Johnson, S. Krishnamoorthy, S. Leyffer, D. Liberty, S. Mitra, T. S. Munson, R. Schreiber, J. Stearley, and E. V. Hensbergen, "Addressing Failures in Exascale Computing," 2013.

(Continued)

*Primary Examiner* — Elmira Mehrmanesh
(74) *Attorney, Agent, or Firm* — Patterson + Sheridan, LLP

(57) ABSTRACT

A method is disclosed, as well as an associated apparatus and computer program product, for checkpointing using a plurality of communicatively coupled compute nodes. The method comprises acquiring health information for a first node of the plurality of compute nodes, and determining a first failure probability for the first node using the health information. The first failure probability corresponds to a predetermined time interval. The method further comprises selecting a second node of the plurality of compute nodes as a partner node for the first node. The second node has a second failure probability for the time interval. A composite failure probability of the first node and the second node is less than the first failure probability. The method further comprises copying checkpoint information from the first node to the partner node.

20 Claims, 4 Drawing Sheets

(56) References Cited

U.S. PATENT DOCUMENTS

| | | | | |
|---|---|---|---|---|
| 8,804,490 | B2* | 8/2014 | Tatipamula | H04L 41/12 370/218 |
| 8,826,272 | B2* | 9/2014 | Glikson | G06F 9/5077 709/226 |
| 8,869,035 | B2* | 10/2014 | Banerjee | H04L 41/12 715/733 |
| 8,875,142 | B2* | 10/2014 | Shivanna | G06F 9/4881 714/1 |
| 8,959,223 | B2* | 2/2015 | Sloma | G06F 9/455 709/220 |
| 9,298,553 | B2* | 3/2016 | Andrade Costa | G06F 11/1415 |
| 9,606,878 | B2* | 3/2017 | Cao | G06F 11/2023 |
| 9,900,791 | B2* | 2/2018 | Kitahara | H04B 17/104 |
| 2008/0005538 | A1* | 1/2008 | Apparao | G06F 9/5027 712/220 |
| 2008/0005624 | A1 | 1/2008 | Kakivaya et al. | |
| 2008/0168314 | A1* | 7/2008 | Narayan | G06F 11/008 714/47.2 |
| 2009/0077414 | A1 | 3/2009 | Benhase et al. | |
| 2009/0150717 | A1 | 6/2009 | Lee et al. | |
| 2015/0227426 | A1 | 8/2015 | Andrade Costa et al. | |

OTHER PUBLICATIONS

F. Cappello, A. Geist, B. Gropp, L. Kale, B. Kramer, and M. Snir, "Toward Exascale Resilience, 8 International Journal of High Performance Computing Applications," vol. 23, No. 4, pp. 374-388, Sep. 2009. [Abstract Only] cA.

D. Hakkarinen and Z. Chen, "Multilevel Diskless Checkpointing," 8 IEEE Transactions on Computers , vol. 62, No. 4, pp. 772-783, 2013.

A. Moody, G. Bronevetsky, K. Mohror, and B. R. de Supinski, "Design, Modeling, and Evaluation of a Scalable Multi-level Checkpointing System," 2010 ACM/IEEE International Conference for High Performance Computing, Networking, Storage and Analysis , 2010, pp. 1-11.

K. Sato, N. Maruyama, K Mohror, A. Moody, T. Gamblin, B. R. de Supinski, and S. Matsuoka, "Design and Modeling of a Non-blocking Checkpointing System," in Proceedings of the International Conference on High Performance Computing, Networking, Storage and Analysis , Los Alamitos, CA, USA, 2012, pp. 19:1-19:10.

M. Agarwal, B. C. Paul, M. Zhang, and S. Mitra, "Circuit Failure Prediction and Its Application to Transistor Aging," in 25th IEEE VLSI Test Symposium, 2007 , pp. 277-286.

S. L. Scott, C. Engelmann, G. R. Valle, T. Naughton, A. Tikotekar, G. Ostrouchov, C. Leangsuksun, N. Naksinehaboon, R. Nassar, M. Paun, F. Mueller, C. Wang, A. B. Nagarajan, and J. Varma, "A Tunable Holistic Resiliency Approach for High-performance Computing Systems," in Proceedings of the 14th ACM SIGPLAN Symposium on Principles and Practice of Parallel Programming , New York, NY, USA, 2009, pp. 305-306.

A. A. Hwang, I. A. Stefanovici, and B. Schroeder, "Cosmic rays don't strike twice," in Proceedings of the seventeenth international conference on Architectural Support for Programming Languages and Operating Systems—ASPLOS ,12 , New York, New York, USA, 2012, vol. 40, p. 111.

V. Sridharan and D. Liberty, "A study of DRAM failures in the field," in 2012 International Conference for High Performance Computing, Networking, Storage and Analysis , 2012, pp. 1-11.

B. Schroeder and G. A. Gibson, "Disk Failures in the Real World: What Does an MTTF of 1,000,000 Hours Mean to You ," in Proceedings of the 5th USENIX Conference on File and Storage Technologies , Berkeley, CA, USA, 2007.

* cited by examiner

CHECKPOINTING USING COMPUTE NODE HEALTH INFORMATION

FEDERALLY-SPONSORED RESEARCH OR DEVELOPMENT

This invention was made with Government support under contract number B599858 awarded by the Department of Energy. The Government has certain rights in the invention.

BACKGROUND

The present disclosure relates to checkpointing in a distributed computing environment, and more specifically, to using health information for a compute node when selecting a partner compute node for local-storage checkpointing.

SUMMARY

According to one embodiment, a method is disclosed for checkpointing using a plurality of communicatively coupled compute nodes. The method comprises acquiring health information for a first node of the plurality of compute nodes, and determining a first failure probability for the first node using the health information. The first failure probability corresponds to a predetermined time interval. The method further comprises selecting a second node of the plurality of compute nodes as a partner node for the first node. The second node has a second failure probability for the time interval. A composite failure probability of the first node and the second node is less than the first failure probability. The method further comprises copying checkpoint information from the first node to the partner node.

According to another embodiment, an apparatus comprises one or more computer processors communicatively coupled with a plurality of compute nodes. The one or more computer processors are configured to acquire health information for a first node of the plurality of compute nodes, and determine a first failure probability for the first node using the health information. The first failure probability corresponds to a predetermined time interval. The one or more computer processors are further configured to select a second node of the plurality of compute nodes as a partner node for the first node. The second node has a second failure probability for the time interval. A composite failure probability of the first node and the second node is less than the first failure probability. Checkpoint information from the first node is copied to the partner node in accordance with the selection.

According to another embodiment, a computer program product comprises a computer-readable storage medium having computer-readable program code embodied therewith. The computer-readable program code is executable by one or more computer processors to acquire health information for a first node of the plurality of compute nodes, and determine a first failure probability for the first node using the health information. The first failure probability corresponds to a predetermined time interval. The computer-readable program code is further executable to select a second node of the plurality of compute nodes as a partner node for the first node. The second node has a second failure probability for the time interval. A composite failure probability of the first node and the second node is less than the first failure probability. Checkpoint information from the first node is copied to the partner node in accordance with the selection.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
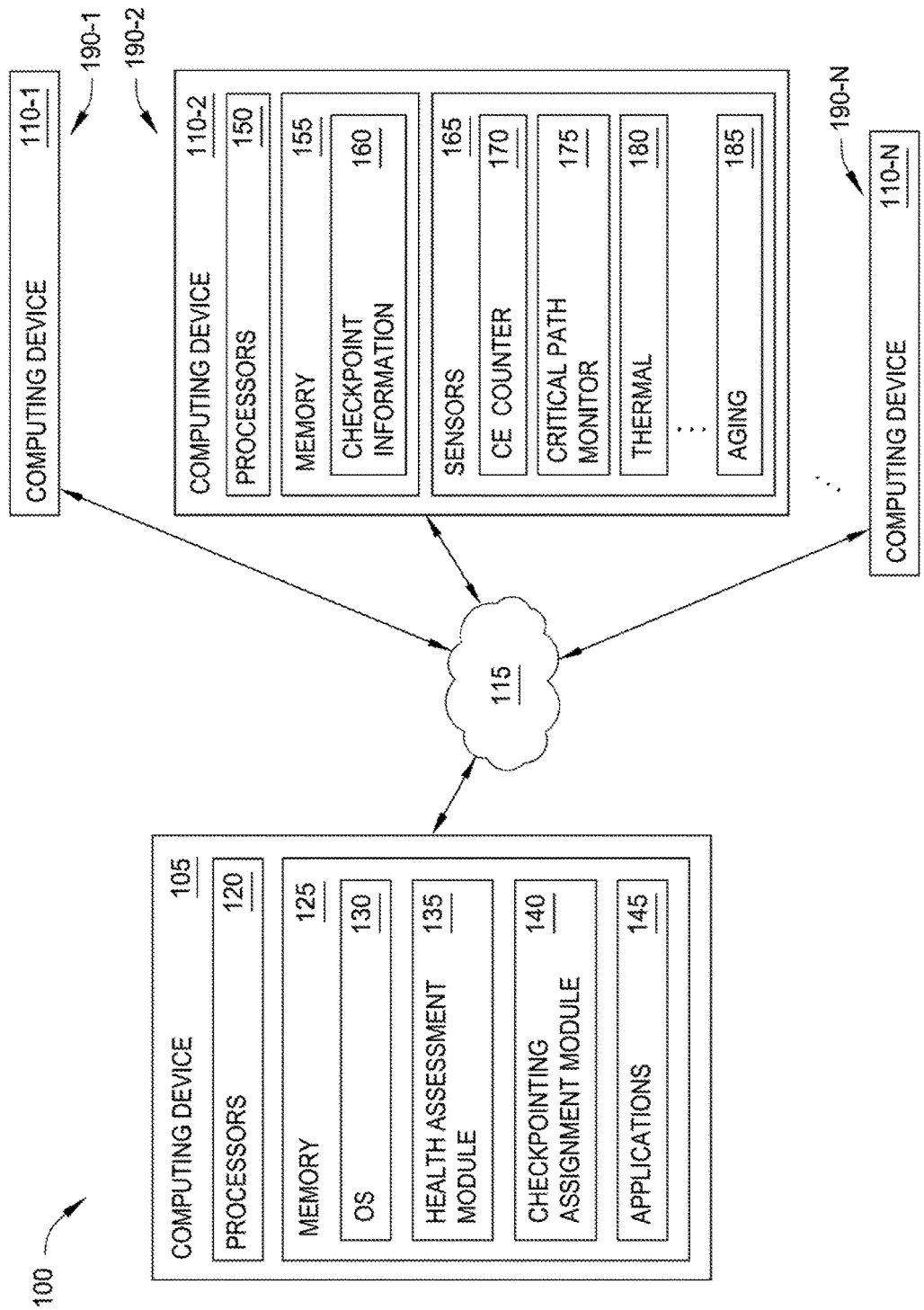
FIG. 1 illustrates an exemplary system having a plurality of compute nodes, according to one or more embodiments.

In a distributed and parallel computing system, hardware failures that are experienced by networked compute nodes can interrupt parallel-executed applications and prevent successful completion of the applications. Techniques such as checkpoint/restart (C/R) maintain information about applications during execution as checkpoints, such that an application may be restarted from a checkpoint after an unexpected termination. A checkpoint may comprise a copy of the system's memory, current register settings, and/or status indicators that is periodically saved to memory.

Multilevel C/R techniques may reduce input/output (I/O) requirements for checkpointing by utilizing storage local to the compute node, such as random access memory (RAM), Flash memory, disk memory, and so forth. In multilevel checkpointing, checkpoint information may be stored across multiple compute nodes during execution of the application, and may be flushed to a parallel file system upon completion of the application. Cached checkpoint information may be used to restart the application when a failure is experienced. One non-limiting example of a multilevel C/R implementation is the Scalable Checkpoint/Restart (SCR) library.

Local storage of checkpoint information allows faster caching but may be less reliable, as the compute node must remain accessible in case of a failure. To tolerate a failure of a compute node, local storage checkpointing techniques may cache data redundantly across one or more "partner" nodes. In the SCR library, for example, this redundancy is implemented in a "partner-copy" mode. The system can withstand multiple hardware failures, so long as a particular compute node and all partner node(s) do not fail simultaneously. However, partner node selection processes is agnostic to the reliability (or "health") of the compute node and the partner node(s). For example, two compute nodes with relatively large failure probabilities may be paired together, resulting in a composite failure probability that is unacceptably large.

The aging and wear of transistors may be significant contributors to hardware failures occurring in compute nodes. Degradation of transistors may be characterized by detectable phenomena such as electro-migration, voltage drop, Negative- or Positive-Biased Temperature Instability (NBTI/PBTI), Hot Carrier Injection (HCI), Time-Dependent Dielectric Breakage (TDDB), and other known deterioration processes. Compute nodes may include hardware sensors and/or monitors that are configured to detect these phenomena and/or other degradation processes. For example, Critical Path Monitors (CPMs) may be configured to substantially continuously measure timing within the compute node, and thus may be configured to detect a degradation in timing that results from transistor wear.

Compute nodes may further include detection and recovery methods that are indicative of impending hardware failures. For example, error-correcting codes (ECC) may be implemented in main memory and/or processor caches to correct errors that result from transistor wear and/or other hardware degradation. ECC may also be used as an error recovery method in hard disk drives, which tend to degrade by different processes. Thus, the incidence of correctable errors (e.g., a number of correctable errors, a rate of correctable errors, etc.) may be suitable for failure prediction.

Compute nodes may further include methods for estimated remaining lifetimes of hardware components, which may also be indicative of impending hardware failures. For example, Flash-based memory may be operable for a finite number of program-cycle erases, and a remaining lifetime of the memory may be estimated and maintained during operation of the compute node.

Embodiments disclosed herein describe checkpointing techniques within a system comprising a plurality of communicatively coupled compute nodes. The selection of partner nodes within the system is based on the health information of the compute nodes. In some embodiments, failure probabilities are determined for the plurality of compute nodes based on the health information. The failure probabilities may correspond to a predetermined time interval, such as a length of time until a next checkpoint. The system may classify each of the compute nodes into different classes based on the relative failure probabilities. For example, the compute nodes may be classified as either "weak" or "strong" based on a failure probability threshold and/or a percentage threshold. In some embodiments, the system pairs individual compute nodes together to improve a composite failure probability.

The system may attempt to pair relatively unhealthy compute nodes with relatively health compute nodes to improve the composite failure probability of the pair, which tends to improve the overall reliability of the system. In some embodiments, each compute node included in the "weak" class is paired with a respective compute node included in the "strong" class. For example, the system may have a default rule preventing the pairing of two "weak" compute nodes.

FIG. 1 illustrates an exemplary system 100 having a plurality of compute nodes 190-1, 190-2, . . . , 190-N, according to one or more embodiments. The system 100 may represent a distributed and parallel computing system. In the system 100, a computing device 105 and a plurality of computing devices 110-1, 110-2, . . . , 110-N (generically, computing device(s) 110) are communicatively coupled via a network 115. The system 100 comprises a plurality of compute nodes 190-1, 190-2, . . . , 190-N (generically, compute node(s) 190) that are configured to perform parallel execution of one or more applications 145 of the computing device 105.

In some embodiments, each computing device 110 corresponds to a respective compute node 190. As shown, the compute node 190-1 corresponds to the computing device 110-1, the compute node 190-2 corresponds to the computing device 110-2, and so forth. In some embodiments, the computing device 105 may be implemented as a hypervisor or otherwise providing coordination and/or control of the compute nodes 190. In some embodiments, the computing device 105 may further be included in the plurality of compute nodes 190.

The computing device 105 comprises one or more computer processors 120 and a memory 125. The one or more computer processors 120 represent any number of processing elements that each can include any number of processing cores. Some non-limiting examples of the one or more computer processors 120 include a microprocessor, a digital signal processor (DSP), an application-specific integrated chip (ASIC), and a field programmable gate array (FPGA), or combinations thereof.

The memory 125 may comprise volatile memory elements (such as random access memory), non-volatile memory elements (such as solid-state, magnetic, optical, or Flash-based storage), and combinations thereof. Moreover, the memory 125 may be distributed across different mediums (e.g., network storage or external hard drives).

In some embodiments, the memory 125 further comprises an operating system (OS) 130 and one or more applications 145. In some embodiments, the OS 130 is configured to coordinate execution of the applications 145 between the various computing devices 110, such that different computing devices 110 may execute different portions of an application 145 in parallel.

The computing device 110-2 (and generally, each computing device 110) comprises one or more computer processors 150, which may have characteristics similar to those discussed above with respect to the one or more computer processors 120 of the computing device 105. The computing device 110-2 further comprises a memory 155, which may have characteristics similar to those discussed above with respect to the memory 125 of the computing device 105.

The computing device 110-2 is further configured to store checkpoint information 160 within the memory 155. The checkpoint information 160 may correspond to the execution of a portion of an application 145 using the one or more computer processors 150. In some embodiments, the checkpoint information 160 comprises one or more of: a copy of the memory 155, current register settings (e.g., a last instruction executed), and/or status indicators associated with the computing device 110-2.

The computing device 110-2 further comprises one or more sensors 165 that are configured to produce health information associated with the computing device 110-2. The computing device 110-2 may be further configured to transmit the health information via the network 115 to a health assessment module 135 of the computing device 105. As shown, the one or more sensors 165 comprise a correctable error (CE) counter 170, a critical path monitor 175, a thermal sensor 180, and an aging sensor 185, although other types of sensors providing suitable information that directly and/or indirectly indicates a reliability of hardware included in the compute node 190-2. Other compositions of the one or more sensors 165 are also possible.

The network 115 may represent one or more networks of any suitable type(s) for communicatively coupling the computing device 105 with the plurality of computing devices 110. For example, the network 115 may comprise the Internet, a local area network (LAN), a wide area network (WAN), and/or a wireless network. The network 115 may comprise copper transmission cables, optical transmission fibers, wireless transmission, routers, firewalls, switches, gateway computers, and/or edge servers.

The memory 125 of the computing device 105 may comprise a plurality of "modules" for performing various functions described herein. In one embodiment, each module includes program code that is executable by one or more of the computer processors 120. However, other embodiments may include modules that are partially or fully implemented in hardware (i.e., circuitry) or firmware.

The memory 125 further comprises a health assessment module 135 and a checkpointing assignment module 140. In some embodiments, one or both of the health assessment module 135 and the checkpointing assignment module 140 are implemented in the OS 130, but this is not a requirement. For example, the health assessment module 135 and/or the checkpointing assignment module 140 may alternately be implemented in firmware of the computing device 105 or the runtime of the computing device 105. In another example, portions of the health assessment module 135 and/or the checkpointing assignment module 140 may alternately be implemented in the computing devices 110.

The health assessment module 135 is configured to acquire, via the network 115, health information corresponding to the plurality of compute nodes 190. The health information may correspond to any suitable information that directly and/or indirectly indicates a reliability of hardware included in the compute nodes 190. Some non-limiting examples of the health information include: detecting one or more phenomena indicating an aging and/or wear of transistors of the compute nodes 190, determining a timing degradation of the compute nodes 190, determining an incidence of correctable errors (e.g., a number of correctable errors, a rate of correctable errors, etc.) for the compute nodes 190, and estimating a number of cycles remaining for a memory of the compute nodes 190. As discussed above, the health information may be provided using one or more sensors 165 of a computing device 110.

In some embodiments, the health information for the compute nodes 190 is acquired responsive to a first checkpoint cycle associated with an application 145. The health information may be acquired at every checkpoint cycle, or with any other suitable periodic timing.

The health assessment module 135 is further configured to determine a failure probability for each of the plurality of compute nodes 190 using the acquired health information. The failure probability for each compute node 190 may be determined based on one or more types of the health information. In some embodiments, the failure probability corresponds to a predetermined time interval. For example, the failure probability may represent a probability of a compute node 190 failing within a time between a first checkpoint cycle and a second checkpoint cycle. Other time intervals may also be suitable.

In some embodiments, the health assessment module 135 maintains a list of failure probabilities for each of the plurality of compute nodes 190. In some embodiments, the health assessment module 135 further comprises a shared token that is configured to control which compute node 190 may update the list at any given time. Stated another way, only one compute node 190 updates the list at a given time when holding the shared token. The other compute nodes 190 wait until they the shared token becomes available. In some embodiments, the health assessment module 135 maintains a shared flag that indicates when the list is "complete", that is, when the list comprises a failure probability for each of the plurality of compute nodes 190.

While described in terms of failure probabilities, the health assessment module 135 may be alternately configured to determine any other suitable measure of the relative reliability of the plurality of compute nodes 190.

Figure 2:
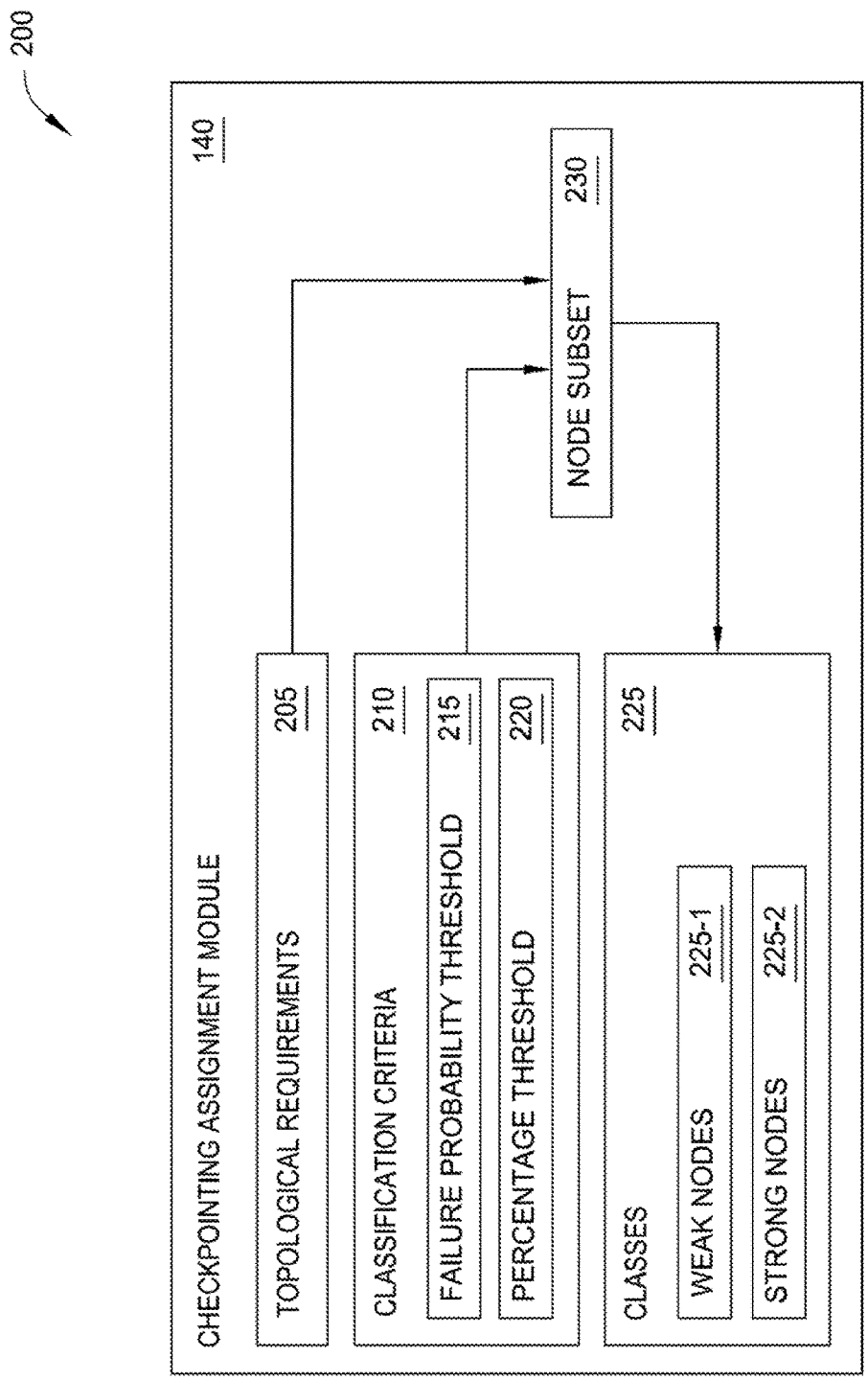
FIG. 2 illustrates an exemplary checkpointing assignment module, according to one or more embodiments.

The checkpointing assignment module 140 is configured to assign partner nodes for the various compute nodes 190 based on the determined failure probabilities. Refer also to FIG. 2, which illustrates an exemplary implementation of the checkpointing assignment module. In diagram 200, a node subset 230 comprises a plurality of the compute nodes 190. In some embodiments, the node subset 230 may represent all of the plurality of compute nodes 190. In other embodiments, the node subset 230 may represent less than all of the plurality of compute nodes 190.

In some embodiments, the checkpointing assignment module 140 comprises one or more topological requirements 205 is used to determine the node subset 230 from a larger plurality of compute nodes 190. The topological requirements 205 may be expressed in any suitable form, such as limiting the node subset 230 to only those compute nodes 190 within a finite geographical or network distance. In some cases, the topological requirements 205 may limit the node subset 230 by specifying a finite number of compute nodes 190 (e.g., the node subset 230 may include up to five compute nodes 190 that meet the topological requirements 205). In other cases, the topological requirements 205 may permit any number of compute nodes 190 in the node subset 230 that meet the topological requirements 205.

The checkpointing assignment module 140 comprises one or more classification criteria 210 for classifying the compute nodes 190 of the node subset 230 into one of a plurality of predefined classes 225. As shown, the checkpointing assignment module 140 comprises two classes: a first class 225-1 corresponding to "weak" compute nodes 190 of the node subset 230, and a second class 225-2 corresponding to "strong" compute nodes 190. Alternate implementations of the checkpointing assignment module 140 may include different numbers and/or types of predefined classes 225. For example, the predefined classes 225 may alternately include at least a third class, such as an intermediate class having failure probabilities between those of the first class 225-1 and those of the second class 225-2. In another example, a third class may include one or more compute nodes 190 to be excluded from being assigned as a partner node.

The classification criteria 210 comprise a failure probability threshold 215 and/or a percentage threshold 220. In some embodiments, compute nodes 190 having a failure probability that is greater than the failure probability threshold 215 may be classified in the first class 225-1 (i.e., as "weak" compute nodes), and the other compute nodes 190 may be classified in the second class 225-2 (i.e., as "strong" compute nodes).

In some embodiments, one or more compute nodes 190 having relatively large failure probabilities of the plurality of compute nodes 190 may be classified in the first class 225-1. For example, the percentage threshold 220 may specify that 50% of the compute nodes 190 having the largest failure probabilities should be classified as "weak". In the case of four (4) compute nodes 190 and a 50% percentage threshold 220, two (2) compute nodes 190 with the largest failure probabilities would be classified in the first class 225-1 and the remaining two (2) compute nodes 190 would be classified in the second class 225-2. Other values of the percentage threshold 220 are also possible.

In some embodiments, the checkpointing assignment module 140 further comprises one or more rules that are applied when assigning partner nodes for the node subset 130. In some embodiments, the checkpointing assignment module 140 applies a first rule intended to prevent a "weak" compute node 190 from being paired with another "weak" compute node 190. However, in some cases, there may not be enough "strong" compute nodes 190 to be paired with all of the "weak" compute nodes 190. Thus, in some embodiments, the checkpointing assignment module 140 determines whether the classification criteria 210 may be relaxed or otherwise adapted. For example, responsive to determining that a first compute node 190 of the first class 225-1 cannot be paired with a second compute node 190 of the second class 225-2, the checkpointing assignment module 140 may adapt the classification criteria 210 for the second class 225-2 to include at least one additional compute node 190 in the second class 225-2. Adapting the classification criteria 210 may comprise increasing the failure probability threshold 215 and/or decreasing the percentage threshold 220 such that one or more compute nodes 190 ordinarily classified as "weak" may be reclassified as "strong" compute nodes 190.

In some embodiments, the checkpointing assignment module 140 applies a second rule that permits a "strong" compute node 190 from being paired with another "strong" compute node 190 only in those cases where there are more "strong" compute nodes 190 than "weak" compute nodes 190 in the node subset 230.

By pairing a "strong" compute node 190 with each of the "weak" compute nodes 190, the system 100 improves a composite failure probability and mitigates a risk of a particular hardware failure preventing the successful completion of one or more applications 145 being executed in parallel. The pairings of compute nodes 190 may be completed in any suitable manner. In one non-limiting example, a particular "weak" compute node 190 may be paired with any of the "strong" compute nodes 190. In another non-limiting example, a "weakest" compute node 190 (i.e., a "weak" compute node 190 having a largest failure probability) is paired with a "strongest" compute node 190 (i.e., a "strong" compute node having a smallest failure probability), a "next-weakest" compute node 190 is paired with a "next-strongest" compute node 190, and so forth.

While one iteration of assigning partner nodes for the node subset 230 has been described, in some embodiments the partner node assignments may be reevaluated and/or reassigned in one or more additional iterations, e.g., based on updated health information. In some embodiments, the checkpointing assignment module 140 may reevaluate the partner node assignments at each checkpoint cycle, although other suitable timing is also possible.

Further, although the health assessment module 135 and the checkpointing assignment module 140 are depicted as being implemented in the computing device 105, alternate implementations may provide a more decentralized approach. For example, each computing device 110 may comprise a respective health assessment module 135 and/or a checkpointing assignment module 140, and the system 100 may achieve the health assessment and/or partner node assignment functions via communication between the plurality of computing devices 110 using the network 115. An exemplary algorithm suitable for implementation in the computing device 105 and/or computing device(s) 110 is provided in Table 1.

TABLE 1

Example algorithm for health assessment and partner node assignment

Figure 3:
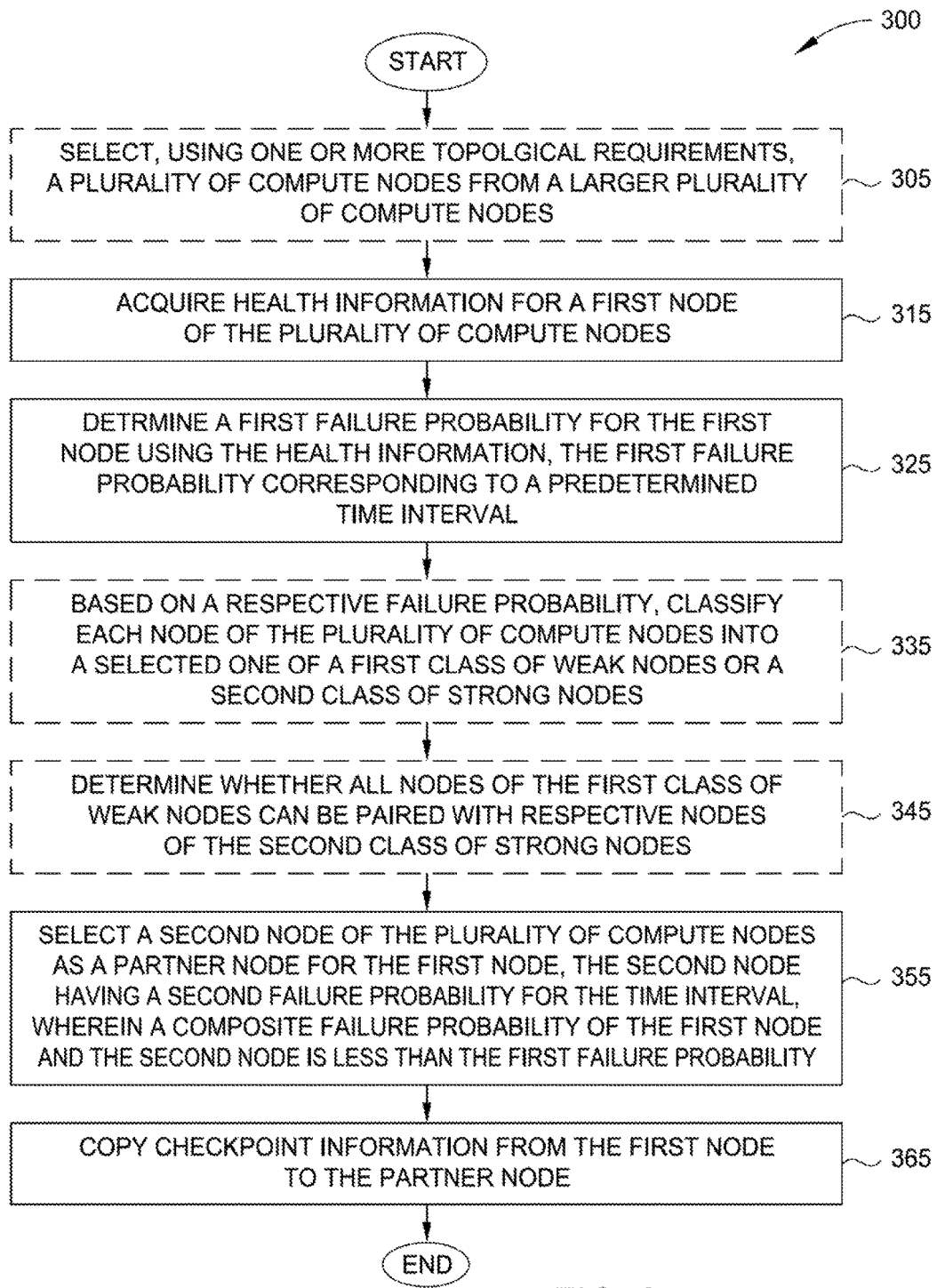
FIG. 3 illustrates an exemplary method of checkpointing using a plurality of compute nodes, according to one or more embodiments.

1:     T ← checkpoint interval
2:     $P_{TH}$ ← failure probability threshold for "weak" node classification
3:     S ← list of allowed sets
4:     M ← list of monitors per node
5:     $N_i$ ← Node instance
6:     Find corresponding set $S_i$ for node $N_i$
7:     s ← number of nodes in set $S_i$
8:     for each monitor $M_i \in$ M do
9:       Get sensor reading $R_{M_i}$
10:       Correlate $R_{M_i}$ to the probability $P_{M_i}$ of a component failure in T
11:       Add $P_{M_i}$ to the list of failure probabilities per node $P_{N_i}$
12:     end for
13:     Get the highest failure probability $P_i$ in $P_{N_i}$
14:     C ← waiting for token
15:     while C ≠ updated do
16:       Get shared token T
17:       if T = free then
18:         if $P_i > P_{TH}$ then
19:           Get shared counter w of weak nodes
20:           Increment w
21:           if $w > \frac{s}{2}$ then
22:             if Allowed set of nodes can be redefined then
23:               Get new list of allowed sets S
24:               Broadcast S to all nodes
25:               go to 6
26:             else
27:               Pairing weak-weak unavoidable
28:               Generate warning
29:             end if
30:           end if
31:         end if
32:         Get shared list of failure probabilities $P_{S_i}$
33:         if $P_{S_i}$ is empty then
34:           Add $P_i$ to $P_{S_i}$
35:         else
36:           Find first element E in $P_{S_i}$, where $E \geq P_i$
37:           Add $P_i$ before E in $P_{S_i}$
38:         end if
39:         p ← number of elements in $P_{S_i}$
40:         if p = s then
41:           X ← list is complete
42:         end if
43:         C ← updated
44:       end if
45:     end while
46:     while X ≠ list is complete do
47:       Wait for all nodes to update $P_{S_i}$
48:     end while
49:     $N_{S_i}$ ← ordered list of corresponding nodes in $P_{S_i}$
50:     Find position i of node $N_i$ in $N_{S_i}$
51:     if $i \leq \frac{s}{2}$ then
52:       Copy checkpoint data to ((s +1) − i)th node in $N_{S_i}$
53:     else
54:       Copy checkpoint data to (s − (i − 1))th node in $N_{S_i}$
55:     end if FIG. 3 illustrates an exemplary method 300 of checkpointing using a plurality of compute nodes, according to one or more embodiments. The method 300 may be used in conjunction with other embodiments, e.g., performed using the health assessment module 135 and/or the checkpointing assignment module 140 of a computing device, as illustrated in FIGS. 1 and 2.

The method 300 begins at optional block 305, where the computing device selects, using one or more topological requirements, a plurality of compute nodes from a larger plurality of compute nodes. At block 315, the computing device acquires health information for a first node of the plurality of compute nodes. At block 325, the computing device determines a first failure probability for the first node using the health information. The first failure probability corresponds to a predetermined time interval.

At optional block 335, and based on a respective failure probability, the computing device classifies each node of the plurality of compute nodes into a selected one of a first class of weak nodes or a second class of strong nodes. At optional block 345, the computing device determines whether all nodes of the first class of weak nodes can be paired with respective nodes of the second class of strong nodes.

At block 355, the computing device selects a second node of the plurality of compute nodes as a partner node for the first node. The second node has a second failure probability for the time interval. A composite failure probability of the first node and the second node is less than the first failure probability. At block 365, the computing device copies checkpoint information from the first node to the partner node. The method 300 ends following completion of block 365.

The method 300 may be further combined with additional steps during execution of the application associated with the checkpoint information. For example, responsive to detecting a failure of a particular computing node, the computing device may retrieve the checkpoint information from the partner node of the failed computing node, and may resume execution of the application using the checkpoint information.

Figure 4:
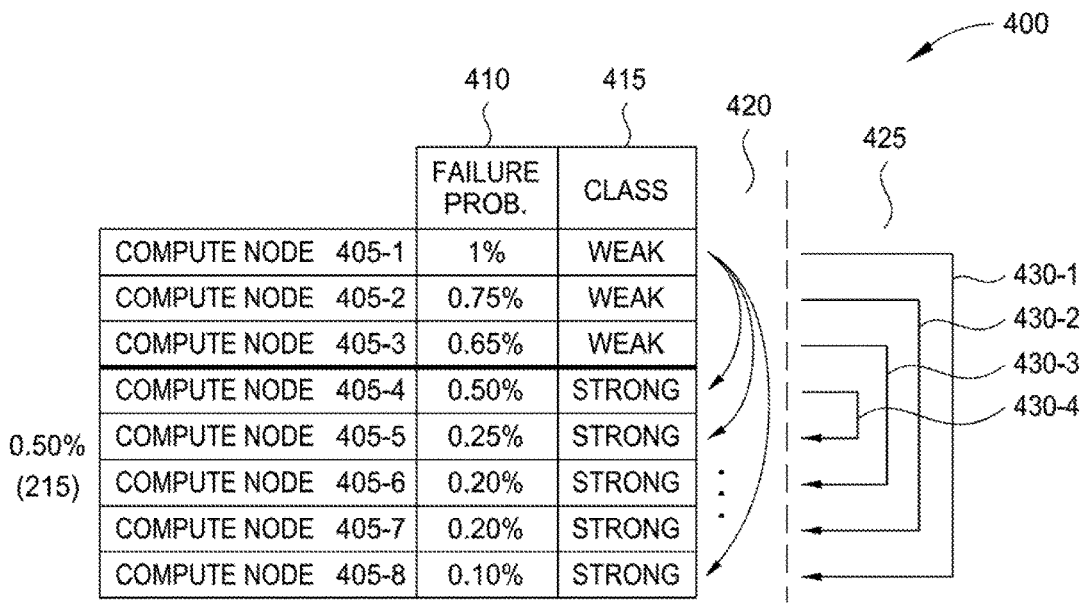
FIG. 4 illustrates an exemplary classification and pairing of a plurality of compute nodes, according to one or more embodiments.

FIG. 4 illustrates an exemplary classification and pairing of a plurality of compute nodes, according to one or more embodiments. The features illustrated in diagram 400 may be used in conjunction with other embodiments, e.g., performed using the health assessment module 135 and/or the checkpointing assignment module 140 of a computing device, as illustrated in FIGS. 1 and 2.

Eight compute nodes 405-1, 405-2, . . . , 405-8 (generically, compute node 405) are illustrated in the diagram 400. Each compute node 405 may have characteristics similar to the compute nodes 190 of FIG. 1. In some cases, the eight compute nodes 405 may represent a subset selected from a larger plurality of compute nodes 405, e.g., according to one or more topological restrictions.

Based on health information received from the compute nodes 405, the computing device may determine a failure probability for each compute node 405. The failure probabilities are illustrated in column 410. Compute nodes 405-1, 405-2, . . . , 405-8 have respective failure probabilities of 1%, 0.75%, 0.65%, 0.50%, 0.25%, 0.20%, 0.20%, and 0.10%. The values of the failure probabilities were selected as simple examples and are not intended to be limiting.

Based on the failure probabilities, each compute node 405 may be classified into a particular class, as illustrated in column 415. A failure probability threshold 215 of 0.50% is applied, such that any compute nodes 405 having a failure probability exceeding 0.50% will be classified as "weak". In diagram 400 three (3) compute nodes 405 are classified as "weak" and five (5) compute nodes 405 are classified as "strong". Other values of the failure probability threshold 215 are also possible. Alternatively, a percentage threshold (e.g., percentage threshold 220 of FIG. 2) may be used to distinguish the compute nodes 405 between different classes.

In some embodiments, a compute node 405 of the "weak" class may be paired with any of the compute nodes 405 of the "strong" class. As shown in section 420, the compute node 405-1, which may be considered the "weakest" compute node for having the highest failure probability, may be paired with any of the compute nodes 405-4, 405-5, . . . , 405-8. No matter which "strong" compute node 405 is selected as a partner node for the compute node 405-1, the composite failure probability will be reduced to less than the failure probability of the compute node 405-1.

For example, pairing the compute node 405-1 with the compute node 405-4 may yield a composite failure probability of 0.005% (that is, 1%×0.50%). Pairing the computing node 405-1 with the compute node 405-8 may yield a composite failure probability of 0.001% (that is, 1%×0.10%). While the composite failure probability has been shown as being calculated using a multiplicative product of the respective failure probabilities, other suitable functions may be used.

In other embodiments, a "weakest" compute node 405 is paired with a "strongest" compute node 405, a "next-weakest" compute node 405 is paired with a "next-strongest" compute node 405, and so forth. As shown in section 425, the compute node 405-1 is paired with the compute node 405-8 as pairing 430-1, the compute node 405-2 is paired with the compute node 405-7 as pairing 430-2, and the compute node 405-3 is paired with the compute node 405-6 as pairing 430-3. Pairing 430-1 may yield a composite failure probability of 0.001% (that is, 1%×0.10%), pairing 430-2 may yield a composite failure probability of 0.0015% (that is, 0.75%×0.20%), and pairing 430-3 may yield a composite failure probability of 0.0013% (that is, 0.65%×0.20%).

In some embodiments, the computing device may avoid pairing two "strong" compute nodes 405 unless all of the "weak" compute nodes 405 have been paired with respective "strong" compute nodes 405. Here, all of the "weak" compute nodes 405-1, 405-2, 405-3 are paired with "strong" compute nodes, and the computing device may therefore pair the remaining "strong" compute nodes 405. As shown, the compute node 405-4 is paired with the compute node 405-5 as pairing 430-4, which may yield a composite failure probability of 0.00125% (that is, 0.50%×0.25%).

Figure 5:
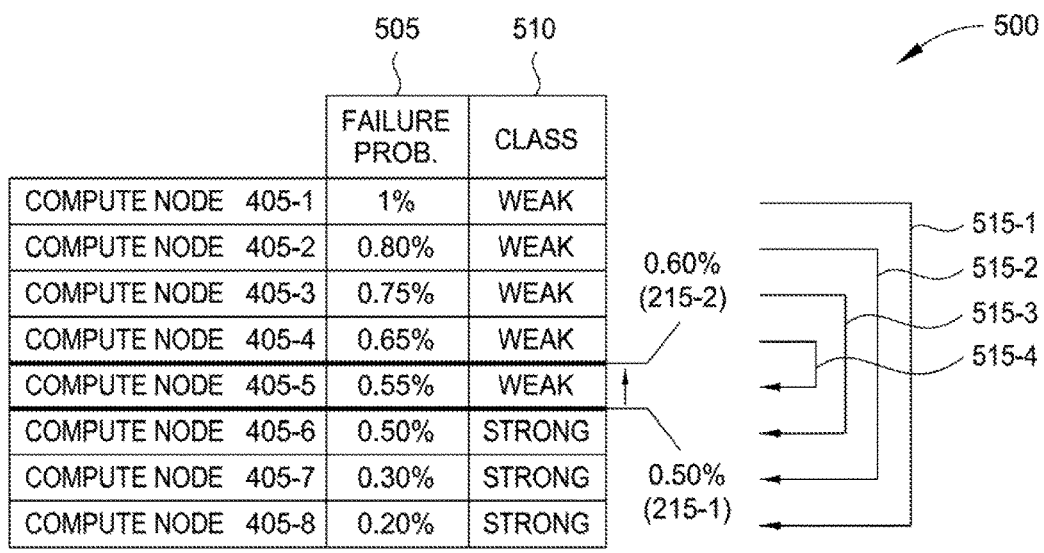
FIG. 5 illustrates an exemplary classification and pairing of a plurality of compute nodes, according to one or more embodiments.

FIG. 5 illustrates an exemplary classification and pairing of a plurality of compute nodes, according to one or more embodiments. The features illustrated in diagram 500 may be used in conjunction with other embodiments, e.g., performed using the health assessment module 135 and/or the checkpointing assignment module 140 of a computing device, as illustrated in FIGS. 1 and 2.

The eight compute nodes 405-1, 405-2, . . . , 405-8 are illustrated in the diagram 500. The failure probabilities are illustrated in column 505. Compute nodes 405-1, 405-2, . . . , 405-8 have respective failure probabilities of 1%, 0.80%, 0.75%, 0.65%, 0.55%, 0.50%, 0.30%, and 0.20%. The values of the failure probabilities were selected as simple examples and are not intended to be limiting.

A first failure probability threshold 215-1 of 0.50% is applied, such that any compute nodes 405 having a failure probability exceeding 0.50% will be classified as "weak". In diagram 500, five (5) compute nodes 405 are classified as "weak" and three (3) compute nodes 405 are classified as "strong". Other values of the failure probability threshold 215 are also possible. Alternatively, a percentage threshold (e.g., percentage threshold 220 of FIG. 2) may be used to distinguish the compute nodes 405 between different classes.

As shown in the diagram 500, the compute node 405-1 is paired with the compute node 405-8 as pairing 515-1, the compute node 405-2 is paired with the compute node 405-7 as pairing 515-2, and the compute node 405-3 is paired with the compute node 405-6 as pairing 515-3. Assuming that the computing device applies a rule preventing pairing "weak" compute nodes 405 together, the "weak" compute nodes 405-4, 405-5 may not have partner nodes initially assigned.

In some embodiments, the computing device determines whether the classification criteria (here, the first failure probability threshold 215-1) may be relaxed or otherwise adapted. In cases where the classification criteria may not be relaxed, the computing device may issue a warning that an unrecoverable system failure is possible or imminent. However, assuming that the classification criteria may be relaxed, the computing device may apply adapted classification criteria to include at least one additional node in the "strong" class. In some cases, the classification criteria may be adapted such that each of the "weak" compute nodes 405 will be paired with a respective "strong" compute node. As shown, the computing device may apply a second failure probability threshold 215-2 of 0.60%. Thus, the compute node 405-5 having a failure probability of 0.55% may be reclassified as a "strong" compute node, and the compute nodes 405-4, 405-5 may be paired together as pairing 515-4.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, execution of an application may be distributed between multiple computing systems in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method of checkpointing using a plurality of communicatively coupled compute nodes, the method comprising:
    acquiring, from one or more sensors, health information for a first node of the plurality of compute nodes;
    determining a first failure probability for the first node using the health information, the first failure probability corresponding to a predetermined time interval;
    based on a respective failure probability, classifying each node of the plurality of compute nodes into a selected one of a first class of weak nodes or a second class of strong nodes, wherein the first node is classified in the first class of weak nodes based on the first failure probability;
    determining whether each node of the first class of weak nodes can be paired with a respective node of the second class of strong nodes;
    selecting, when each node of the first class can be paired with a respective node of the second class, a second node of the plurality of compute nodes to operate as a partner node for the first node, the second node having a second failure probability for the time interval, wherein selecting the second node comprises:
        calculating, using the first failure probability and the second failure probability, a composite failure probability for a combination of the first node and the second node; and
        determining whether the composite failure probability of the combination is less than the first failure probability; and
    copying checkpoint information from the first node to the partner node, wherein the checkpoint information corresponds to execution of at least a portion of an application using the first node.

2. The method of claim 1, wherein acquiring the health information for the first node comprises at least one of:
    determining an incidence of correctable errors for the first node,
    determining a timing degradation for the first node, and
    estimating a number of cycles remaining for a memory of the first node.

3. The method of claim 1, wherein acquiring health information for the first node is responsive to a first checkpoint cycle, and
wherein the time interval corresponds to a time between the first checkpoint cycle and a second checkpoint cycle.

4. The method of claim 1,
wherein the second node is classified in the second class based on the second failure probability.

5. The method of claim 1, further comprising:
responsive to determining that at least the first node cannot be paired with a respective node of the second class, adapting classification criteria for the second class to include at least one additional node in the second class.

6. The method of claim 1, further comprising:
selecting, using one or more topological requirements, the plurality of compute nodes from a larger plurality of compute nodes.

7. The method of claim 1,
wherein a weakest node of the first class is paired with a strongest node of the second class, and
wherein a next-weakest node of the first class is paired with a next-strongest node of the second class.

8. The method of claim 1, further comprising:
responsive to determining that each node of the first class can be paired with a respective node of the second class, pairing remaining nodes of the second class with each other.

9. An apparatus comprising:
one or more computer processors communicatively coupled with a plurality of compute nodes, wherein the one or more computer processors are configured to:
acquire, from one or more sensors, health information for a first node of the plurality of compute nodes;
determine a first failure probability for the first node using the health information, the first failure probability corresponding to a predetermined time interval;
based on a respective failure probability, classify each node of the plurality of compute nodes into a selected one of a first class of weak nodes or a second class of strong nodes, wherein the first node is classified in the first class of weak nodes based on the first failure probability;
determine whether each node of the first class of weak nodes can be paired with a respective node of the second class of strong nodes; and
select, when each node of the first class can be paired with a respective node of the second class, a second node of the plurality of compute nodes to operate as a partner node for the first node, the second node having a second failure probability for the time interval, wherein selecting the second node comprises:
calculating, using the first failure probability and the second failure probability, a composite failure probability for a combination of the first node and the second node; and
determining whether the composite failure probability of the combination is less than the first failure probability, wherein checkpoint information from the first node is copied to the partner node in accordance with the selection, and
wherein the checkpoint information corresponds to execution of at least a portion of an application using the first node.

10. The apparatus of claim 9, wherein acquiring the health information for the first node comprises at least one of:
determining an incidence of correctable errors for the first node,
determining a timing degradation for the first node, and
estimating a number of cycles remaining for a memory of the first node.

11. The apparatus of claim 9, wherein acquiring health information for the first node is responsive to a first checkpoint cycle, and
wherein the time interval corresponds to a time between the first checkpoint cycle and a second checkpoint cycle.

12. The apparatus of claim 9,
wherein the second node is classified in the second class based on the second failure probability.

13. The apparatus of claim 9, wherein the one or more computer processors are further configured to:
responsive to determining that at least the first node cannot be paired with a respective node of the second class, adapt classification criteria for the second class to include at least one additional node in the second class.

14. The apparatus of claim 9, wherein the one or more computer processors are further configured to:
select, using one or more topological requirements, the plurality of compute nodes from a larger plurality of compute nodes.

15. A computer program product comprising:
a computer-readable storage medium having computer-readable program code embodied therewith, the computer-readable program code executable by one or more computer processors to:
acquire, from one or more sensors, health information for a first node of the plurality of compute nodes;
determine a first failure probability for the first node using the health information, the first failure probability corresponding to a predetermined time interval;
based on a respective failure probability, classify each node of the plurality of compute nodes into a selected one of a first class of weak nodes or a second class of strong nodes, wherein the first node is classified in the first class of weak nodes based on the first failure probability;
determine whether each node of the first class of weak nodes can be paired with a respective node of the second class of strong nodes; and
select, when each node of the first class can be paired with a respective node of the second class, a second node of the plurality of compute nodes to operate as a partner node for the first node, the second node having a second failure probability for the time interval, wherein selecting the second node comprises:
calculating, using the first failure probability and the second failure probability, a composite failure probability for a combination of the first node and the second node; and
determining whether the composite failure probability of the combination is less than the first failure probability, wherein checkpoint information from the first node is copied to the partner node in accordance with the selection, and wherein the checkpoint information corresponds to execution of at least a portion of an application using the first node.

16. The computer program product of claim 15, wherein acquiring the health information for the first node comprises at least one of:

determining an incidence of correctable errors for the first node, determining a timing degradation for the first node, and estimating a number of cycles remaining for a memory of the first node.

17. The computer program product of claim 15, wherein acquiring health information for the first node is responsive to a first checkpoint cycle, and wherein the time interval corresponds to a time between the first checkpoint cycle and a second checkpoint cycle.

18. The computer program product of claim 15, wherein the second node is classified in the second class based on the second failure probability.

19. The computer program product of claim 15, wherein the computer-readable program code is further executable to:

responsive to determining that at least the first node cannot be paired with a respective node of the second class, adapting classification criteria for the second class to include at least one additional node in the second class.

20. The computer program product of claim 15, wherein the computer-readable program code is further executable to:

select, using one or more topological requirements, the plurality of compute nodes from a larger plurality of compute nodes.

* * * * *